(12) United States Patent
Granzow et al.

(10) Patent No.: US 7,021,441 B2
(45) Date of Patent: Apr. 4, 2006

(54) DISTRIBUTOR GEAR WITH ADJUSTABLE COUPLING

(75) Inventors: Claus Granzow, Tettnang (DE); Karl-Hermann Ketteler, Markdorf (DE); Ünal Gazyakan, Friedrichshafen (DE); Detlef Baasch, Friedrichshafen (DE); Christoph Pelchen, Tettnang (DE); Barbara Schmohl, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 2 days.

(21) Appl. No.: 10/776,567

(22) Filed: Feb. 11, 2004

(65) Prior Publication Data

US 2004/0163921 A1 Aug. 26, 2004

(30) Foreign Application Priority Data

Feb. 20, 2003 (DE) .............................. 103 07 017

(51) Int. Cl.
*B16K 17/344* (2006.01)

(52) U.S. Cl. ...................... 192/84.6; 192/94; 180/247

(58) Field of Classification Search ................ 192/233, 192/247, 249, 84.6, 94; 180/233, 247, 249
See application file for complete search history.

(56) References Cited

U.S. PATENT DOCUMENTS

| 4,899,856 A | | 2/1990 | Kurihara ..................... 192/2 R |
| 5,199,325 A | | 4/1993 | Reuter et al. ................. 74/861 |
| 5,423,235 A | * | 6/1995 | Botterill et al. ........ 74/665 GA |
| 6,808,037 B1 | * | 10/2004 | Mueller ..................... 180/247 |

FOREIGN PATENT DOCUMENTS

| DE | 39 08 478 A1 | 10/1989 |
| DE | 38 26 933 A1 | 2/1990 |
| DE | 90 07 320.7 | 7/1991 |
| DE | 42 30 326 A1 | 3/1993 |
| DE | 38 17 352 C2 | 3/1995 |
| DE | 199 16 366 A1 | 10/2000 |

* cited by examiner

*Primary Examiner*—Saul Rodriguez
(74) *Attorney, Agent, or Firm*—Davis & Bujold, P.L.L.C.

(57) ABSTRACT

A distributor gear (1) with an adjustable coupling device (5) for a vehicle, in particular for a vehicle with a shiftable all-wheel drive is described for the distribution of an incoming drive torque via a drive shaft (2) to at least two output shafts (3, 4). It is moreover provided that an output shaft (4) can be connected via the coupling device (5) with the drive shaft (2) and that the coupling device (5) can be actuated via an electric motor (9) and a drive converter device (10) located between the electric motor (9) and the coupling device (5) for the conversion of rotary movement of the electric motor (9) into a translatory actuation movement for the coupling device (5). The electric motor (9) is incorporated into a gear (7).

14 Claims, 1 Drawing Sheet

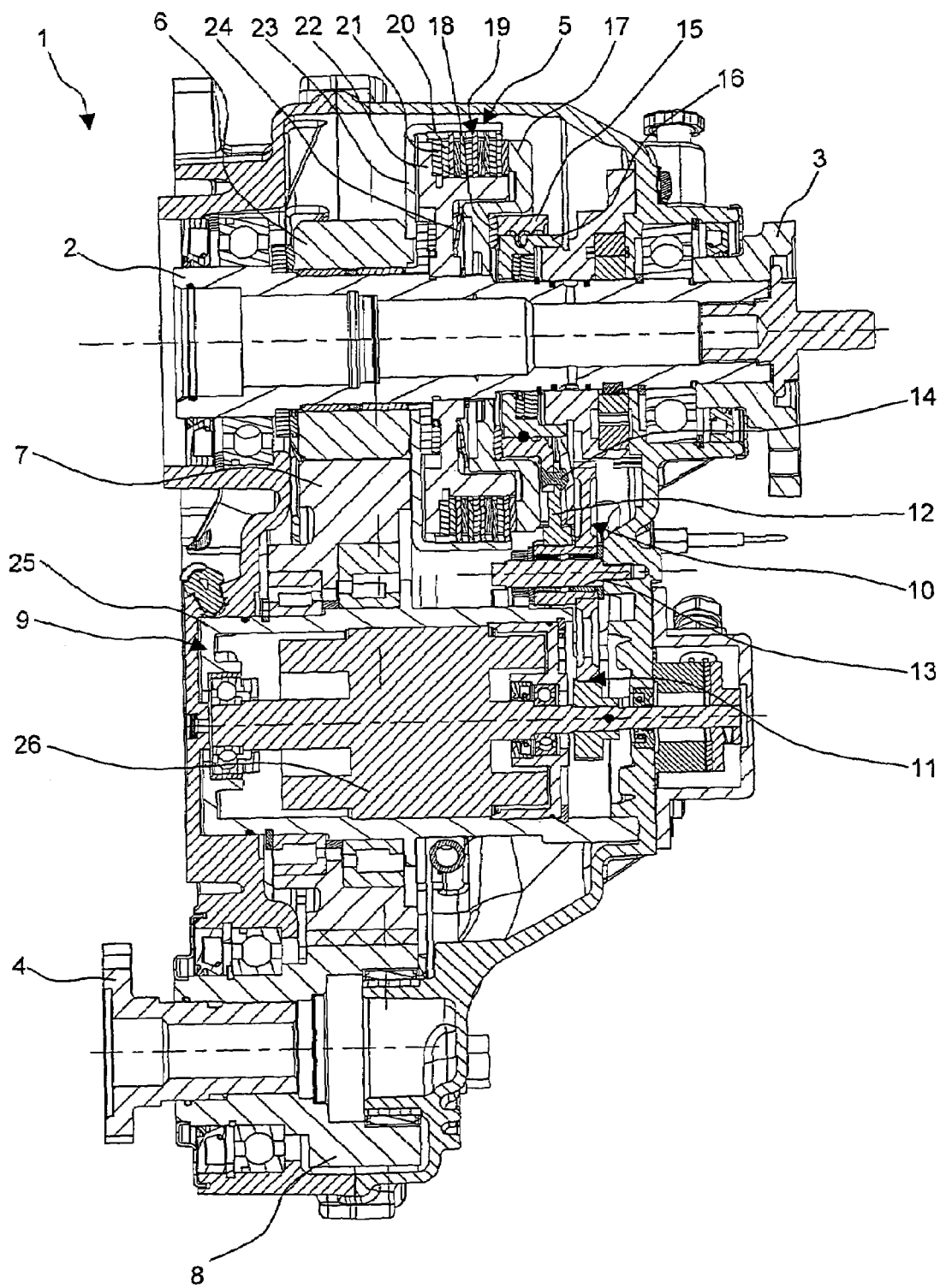

DISTRIBUTOR GEAR WITH ADJUSTABLE COUPLING

This application claims priority from German Application Ser. No. 103 07 017.6 filed Feb. 20, 2003.

FIELD OF THE INVENTION

The invention concerns a distributor gear with an adjustable coupling.

BACKGROUND OF THE INVENTION

Lockable distributor gears for an all-wheel drive or for systems with shiftable all-wheel drives are known from practice where a locking or coupling function is designed for adding one or more drive wheels equipped with a coupling device in the form of a multiple disc clutch. The coupling device is actuated by an electric motor that has an effect, for example, on a segment gear ring via a spur gear step in form of a transmission step which, in turn, is connected with the spindle of a drive converter device.

A spindle nut located on the spindle is pivotally fastened in such a distributor gear and is adjusted in the axial direction with the rotation of the spindle according to the gradient of the thread. Depending on the rotational direction of the electric motor, the coupling device is closed or opened via the axial movement of the spindle nut.

The electric motor is located outside the distributor gear and has its own housing. The drive of the coupling device takes place via a shaft that leads through the housing of the distributor gear that finally is effectively connected with the coupling device via a drive converter device.

The disadvantage, however, that the arrangement of the electric motor outside of the distributor gear provided, gives the distributor gear an unfavorable to incorporate external shape that, moreover, requires much construction space caused because of a really overhanging electric motor.

The present invention is based on the task of creating a distributor gear with an external shape that can be easily integrated into a power train and that is characterized by a low construction space.

SUMMARY OF THE INVENTION

The distributor gear, according to the invention, has a low construction space requirement and an external shape that can be easily integrated since the electric motor is incorporated into the housing of the distributor gear and into a gear of the distributor gear.

The economy of construction space is achieved in integrating the electric motor into the area of the interior space of the distributor gear that had been occupied with gear material in the distributor gears known in practice. In this way, the distributor gear does not have any protruding parts on the outer side of the gear box and the distributor gear can be designed with an external shape that can be easily integrated into a power train.

In addition, the compact construction form of the distributor gear, according to the invention, has so-called package advantages in contrast to the external arrangement of the electric motor. The electric motor is also significantly more protected from environmental influences, for example, contamination, atmospheric moisture and such, because it is additionally protected by the housing of the distributor gear in comparison with an external arrangement.

BRIEF DESCRIPTION OF THE DRAWING

The invention will now be described, by way of example, with reference to the accompanying drawings in which:

FIG. 1 shows a partial section of a distributor gear, according to the invention, with a drive converter device, an electric motor and a coupling device for connection to an output shaft.

DETAILED DESCRIPTION OF THE INVENTION

In the FIGURE, a distributor gear 1 of a motor vehicle constructed as a longitudinal distributor gear is shown in a longitudinal section, by means of which an incoming drive torque can be guided via a drive shaft 2 to two output shafts, whereby in any given case only the two connecting flanges 3, 4 of the two output shafts are represented to which the output shafts are flanged. The two connecting flanges 3, 4 are subsequently equated in the description of their functionality of the distributor gear 1 with the output shafts so that the reference numbers of the two connecting flanges are used for the two output shafts that are not represented.

The first output shaft 3 is directly connected with the drive shaft 2 so that the drive torque is led directly from the drive shaft 2 to the first output shaft 3. The second output shaft 4 is connected to the drive shaft 2 via a coupling device 5, a first gear 6 located on the drive shaft 2, an intermediate gear 7 and a second gear 8 if the coupling device 5 is in a state in which a torque can be passed via the coupling device 5.

The coupling device 5 can be actuated via an electric motor 9, whereby a drive converter device 10 is located between the coupling device 5 and the electric motor 9, whereby a rotary movement of the electric motor 9 is transformed in a translatory actuation movement to activate the coupling device.

The drive converter device 10 is equipped with a transmission step 11 that is shown here as a spur gear step. As an alternative, the translator step could be realized as a planetary wheel set in a further design, or could have another appropriate form.

The drive converter device 10 is equipped with a gear segment ring 12 that is engaged with another gear 13 of the spur step 11. In addition, the gear segment ring 12 is here connected with a spindle nut 15 of a spindle-spindle nut design via rivets 14 so that a rotational movement of the gear segment ring is transferred directly to the spindle nut 12.

It obviously lies in the discretion of the expert to create the torsion-resistant connection between the gear segment ring and the spindle nut as an alternative to the rivet connection via different appropriate connection types such as screwing, pressing, welding or the like.

The spindle nut 15 can be rotated and is adjustable in the axial direction of the drive shaft 2 on a spindle 16 of the spindle-spindle nut design whereby the spindle is 16 is located torsion-resistant and fixed in the axial direction in the distributor gear 1.

The spindle-spindle nut design and the gradient of a spindle thread is designed in such a way that the spindle nut 15 has the same rotational direction as the drive shaft 2 during the closing process of the coupling device 5. Drag torques which occur between the spindle nut 15 and the coupling device 5 favor the closing process of the coupling device 5.

The above described drag torques result from the constructional configuration of the coupling device 5 and the drive converter device 10 described below:

The coupling device 5 is equipped with a thrust washer 17 that is connected torsion-resistant with the drive shaft 2 and rotates in the operation of the distributor gear 1 with the same rotational speed as the drive shaft 2. The spindle nut 15 of the drive converter device 10 is moved in the direction of the thrust washer 17 during the closing process of the coupling device 5, meaning in the axial direction of the drive shaft 2, so that the friction between the thrust washer 17 and the spindle nut 15 increases with the increased adjusting path of the spindle nut 15, and the above described drag torques support the rotation of the spindle nut.

Due to the fact that the spindle nut 15 has the same rotational direction as the drive shaft 2 during the closing process of the coupling device 5, these drag torques support the closing process of the coupling device 5. A drive torque to be applied by the electric motor 9 is, therefore, reduced during the closing process of the coupling device 5 in contrast to the constructions known in practice.

The thrust washer 17 is moved with increasing axial displacement travel of the spindle nut 15 to a lamella package 19 of the coupling device constructed as a multiple disc clutch during the closing process of the coupling device 5. The lamella package 19 consists of an inner lamella 20 and an outer lamella 21, whereby the inner lamella 20 is connected torsion-resistant and adjustable in the axial direction of the drive shaft 2 to an inner lamella support 22. The outer lamella 21 is connected torsion-resistant and adjustable in the axial direction of the drive shaft 2 with an outer lamella support 23 which, in turn, is connected torsion-resistant with the first gear 6.

The inner lamella support 22 is connected torsion-resistant and axially not displaceable with the drive shaft 2, whereby the thrust washer 17 is sprung on the inner lamella support 22 counter to the closing direction of the coupling device 5 via a spring device 24 in form of a disc spring. Thus, the thrust washer 17 is supported by the spring device 24 in the direction of the drive converter direction 10 during the opening phase of the coupling device 5 whereby the spindle nut 15 is moved away from the coupling device 5 and the transfer capacity of the coupling device 5 is reduced or totally suspended depending on the opening angle of the coupling device 5. The spring essentially serves to open the lamella package completely, especially in power failures. The lamella package itself has sufficient stored spring energy and suffices for turning back the electric motor.

In harmony with the adjusted transferability of the coupling device 5 via the above described actuation of the electric motor 9, a part of the drive torque introduced via the drive shaft 2 into the distributor gear 1 is transferred to the second output shaft 4 via the first gear 6, the intermediate gear wheel 7 and the second gear 8.

The intermediate gear wheel 7 is located pivotally here in a housing 25 of the electric motor 9 in the form of an induction motor. The layout of the electric motor 9 in a hollow intermediate gear wheel 7 provides an extremely compact and economic construction method of the distributor gear 1 requiring significantly less construction space in a vehicle in contrast to an electric motor located outside the distributor gear housing.

In addition, the electric motor 9 incorporated into the distributor gear 1 is exposed to significantly fewer environmental stresses, as it is additionally protected from the environment by the housing of the distributor gear 1.

The configuration of the electric motor 9 as a Ket rotating field motor offers the opportunity of using smaller dimensions for the electric motor in comparison to a design as a direct current motor, as the rotating field motors produce more power with the same dimensions compared to direct current motors. This is especially advantageous, in particular with a combination with the above described design of the drive converter device 10, meaning that the spindle nut 15 has the same rotational direction as the drive shaft 2 during the closing process of the coupling device 5, that the electric motor 9 or the rotating field motor can be designed with a significantly smaller size than the direct current motor of the known distributor gear.

In addition, the construction of the electric motor 9 as a rotating field motor offers the advantage that the electric motor 9 has a significantly longer life cycle, which can be operated practically without any wear and which is characterized by a high temperature insensibility. The rotating field motor 9 also has a higher adjustment accuracy and a smaller mass inertia moment than a direct current motor, which improves the adjustment dynamic of the distributor gear 1 significantly.

Furthermore, the possibility exists of cooling the electric motor 9 with transmission lubricant as an alternative to the design of the rotating field motor 9 shown in the FIGURE. This is possible in particular with an asynchronous motor as a rotor 26 of the asynchronous motor can be operated with transmission lubricant or other media, preferably with cooling media. This option does not exist with direct current motors that are designed with brushes because they must be sealed completely from the interior space of the distributor gear and the access of transmission lubricant.

One can, in addition, advantageously forgo the electromagnetic brake through which an actuation torque is created for the coupling device 5 in order to keep the coupling device in a closed state for a longer period of time with the use of a rotating field motor as a so-called burning in of the brushes takes place during energizing without rotational movement in a rotating field motor in contrast to the direct current motor. Such an annealing of the brushes in direct current motors takes place when a direct current motor is energized for a longer period of time based on the holding torque to be created and based on the fact that the direct current motor does not perform any rotation or is only moved within a small angular area.

It can, of course, also provided in an advantageous construction deviating from the present exemplary of the distributor gear (not represented in greater detail), according to the invention, that the electromagnetic brake for holding the coupling device in a closed state is integrated into the distributor gear if a longer closing phase of the coupling device is desired by the appropriate demand profile which represent an overload even for a Ket rotating field motor.

REFERENCE NUMERALS 1 distributor gear
2 drive shaft
3 first output shaft, connecting flange
4 second output shaft, connecting flange
5 coupling device
6 first gear
7 intermediate gear wheel
8 second gear
9 electric motor
10 drive converter device
11 spur wheel step, transmission step
12 gear segment ring
13 additional gear
14 rivets
15 spindle nut 16 spindle
17 thrust washer
19 lamella package
20 inner lamella
21 outer lamella
22 inner lamella support
23 outer lamella support
24 spring device
25 housing of the electric motor
26 rotor of the electric motor

The invention claimed is:

1. A distributor gear (1), for a vehicle, with an adjustable coupling device (5), the distributor gear (1) having a shiftable all wheel drive for distribution of an incoming drive torque via a drive shaft (2) between at least first and second output shafts (3, 4) whereby the second output shaft (4) is selectively connectable with the drive shaft (2) via the coupling device (5), and where the coupling device (5) being actuated via an electric motor (9), and a drive converter device (10), located between the electric motor (9) and the coupling device (5), for conversion of rotary movement of the electric motor (9) into a translatory actuation movement for the coupling device (5);
    wherein the electric motor (9) is integrated within an intermediate gear (7) such that the intermediate gear (7) surrounds and rotates around the electric motor (9).

2. The distributor gear according to claim 1, wherein at least a part of the drive torque of the drive shaft (2) is transferred to the second output shaft (4) via the intermediate gear (7).

3. The distributor gear according to claim 1, wherein the electric motor (9) is a rotating field motor (Ket).

4. The distributor gear according to claim 1, wherein the electric motor (9) is operated with transmission lubricant and cooling characteristics of the transmission lubricant are used for the electric motor.

5. The distributor gear according to claim 1, wherein the second output shaft (4) is connected to the drive shaft (2) via the coupling device 5, a first gear (6) supported on the drive shaft (2), the intermediate gear 7 and a second gear (8) supported by the second output shaft (4).

6. The distributor gear according to claim 5, wherein the coupling device has a lamella package (19) constructed as a multiple disc clutch, and the lamella package (19) comprises an inner lamella (20) and an outer lamella (21), whereby the inner lamella (20) is connected torsion-resistant and adjustable in an axial direction of the drive shaft (2) toward an inner lamella support (22), and the outer lamella (21) is connected torsion-resistant and adjustable in the axial direction of the drive shaft (2) with an outer lamella support (23) which is connected torsion-resistant with the first gear (6).

7. The distributor gear according to claim 1, wherein the drive torque is guided by the drive shaft (2) to the first output shaft (3) and the second output shaft (4), and the first output shaft (3) is directly connected with the drive shaft (2) so that the drive torque is supplied directly from the drive shaft (2) to the first output shaft (3).

8. The distributor gear according to claim 1, wherein the drive torque is guided by the drive shaft (2) to the first output shaft (3) and the second output shaft (4), and the first output shaft (3) is directly connected with the drive shaft (2) so that the drive torque is supplied directly from the drive shaft (2) to the first output shaft (3) and the second output shaft (4) is connected to the drive shaft (2) via the coupling device (5), a first gear (6) supported on the drive shaft (2), the intermediate gear (7) and a second gear (8) supported by the second output shaft (4).

9. The distributor gear according to claim 1, wherein the drive converter device (10) comprises a gear segment ring (12) and another gear (13) which drive a spindle nut (15) of the drive converter device (10).

10. The distributor gear according to claim 9, wherein the coupling device (5) is equipped with a thrust washer (17) which is connected, in a torsion-resistant fashion, with the drive shaft (2) and rotates during the actuation of the distributor gear (1), and the spindle nut (15) is moved toward the thrust washer (17) during engagement of the coupling device (5) so that friction between the thrust washer (17) and the spindle nut (15) increases.

11. A distributor gear (1), for a vehicle, with an adjustable coupling device (5), the distributor gear (1) having a shiftable all wheel drive for distribution of an incoming drive torque via a drive shaft (2) between at least first and second output shafts (3, 4) whereby the second output shaft (4) is selectively connectable with the drive shaft (2) via the coupling device (5), and where the coupling device (5) being actuated via an electric motor (9), and a drive converter device (10), located between the electric motor (9) and the coupling device (5), for conversion of rotary movement of the electric motor (9) into a translatory actuation movement for the coupling device (5);
    wherein the electric motor (9) is integrated in an intermediate gear (7); and
    a housing (25) of the electric motor (9) supports a bearing for the intermediate gear (7).

12. A distributor gear (1), for a vehicle, with an adjustable coupling device (5), the distributor gear (1) having a shiftable all wheel drive for distribution of an incoming drive torque via a drive shaft (2) between at least first and second output shafts (3, 4) whereby the second output shaft (4) is selectively connectable with the drive shaft (2) via the coupling device (5), and where the coupling device (5) being actuated via an electric motor (9), and a drive converter device (10), located between the electric motor (9) and the coupling device (5), for conversion of rotary movement of the electric motor (9) into a translatory actuation movement for the coupling device (5);
    wherein the electric motor (9) is integrated in an intermediate gear (7); and
    the drive converter device (10) is equipped with a spindle (16) and a spindle nut (15) is supported on the spindle (16).

13. The distributor gear according to claim 12, wherein the spindle (16) is rotationally fixed and the spindle nut (15) is rotated by the electric motor (9) whereby the spindle nut (15) has a same rotational direction as the drive shaft (2) during closing of the coupling device (5) to transfer a portion of the drive torque from the drive shaft (2) to the second output shaft (4).

14. The distributor gear according to claim 12, wherein the spindle nut (15) is rotationally fixed, and the spindle (16) is rotated by the electric motor (9) whereby the spindle (16) has a same rotational direction as the drive shaft (2) during closing of the coupling device (5) to transfer a portion of the drive torque from the drive shaft (2) to the second output shaft (4).

* * * * *